United States Patent
Sano

[11] Patent Number: 6,155,106
[45] Date of Patent: Dec. 5, 2000

[54] STEERING ANGLE SENSOR UNIT

[75] Inventor: Tadashi Sano, Miyagi-ken, Japan

[73] Assignee: Alps Electric Co., Inc., Tokyo, Japan

[21] Appl. No.: 09/167,743

[22] Filed: Oct. 7, 1998

[30] Foreign Application Priority Data

Oct. 29, 1997 [JP] Japan ................................ 9-297227
May 7, 1998 [JP] Japan ............................... 10-124764

[51] Int. Cl.⁷ .......................... G01M 19/00; G01M 7/00
[52] U.S. Cl. ........................................ 73/118.1; 33/1 N
[58] Field of Search .......................... 73/118.1, 862.191, 73/862.08; 340/438; 33/1 PT, 1 N

[56] References Cited

U.S. PATENT DOCUMENTS

| | | | |
|---|---|---|---|
| 5,218,769 | 6/1993 | Tranchon ................................. | 33/1 PT |
| 5,309,758 | 5/1994 | Kubota et al. ......................... | 73/118.1 |
| 5,373,444 | 12/1994 | Takahashi . | |
| 5,734,160 | 3/1998 | Chung et al. . | |
| 5,818,038 | 10/1998 | Kerkmann et al. . | |
| 5,930,905 | 8/1999 | Zabler et al. ........................... | 33/1 PT |

*Primary Examiner*—Eric S. McCall
*Attorney, Agent, or Firm*—Brinks Hofer Gilson & Lione

[57] ABSTRACT

A steering angle sensor unit includes a rotary connector 200 for electrically connecting an electric device mounted on a steering wheel and an electric device mounted on a vehicle body, and a steering angle sensor 210 for detecting information about the turn of the steering wheel. A rotor member 2 in the rotary connector 200 and a rotor member 3 in the steering angle sensor 210 are formed of separate members, one of the rotor member 2 in the rotary connector 200 and the rotor member 3 in the steering angle sensor 210 has a slot 2d extending in the radial direction, the other rotor member 2 or 3 has a cylindrical projection 3i having almost the same diameter as the minor diameter of the slot 2d, and the slot 2d and the projection 3i are engaged with each other.

9 Claims, 12 Drawing Sheets

STEERING ANGLE SENSOR UNIT

BACKGROUND OF THE INVENTION

1. Field of the Invention

The present invention relates to a steering angle sensor unit mounted on a steering shaft of a motor vehicle and the like to detect information about the turn of a steering wheel and to electrically connect electric devices mounted on the steering wheel and a vehicle body.

2. Description of the Related Art

Hitherto, a device called a steering angle sensor unit has been proposed which includes a combination of a steering angle sensor for detecting information about the turn of a steering wheel and a rotary connector for electrically connecting an electric device mounted on the steering wheel and an electric device mounted on a vehicle body.

A steering angle sensor detects the steering angle and the steering direction of the steering wheel, and uses these to control the damping force of the suspension, the shift position of the automatic transmission, and the steering of the rear wheels of a four-wheel steering (4WS) vehicle. In general, the steering angle sensor comprises a code plate mounted on a rotor section that is rotationally driven by the steering wheel, and a light emitting device and a photoreceptor mounted inside a casing for forming a stator section. On the other hand, a rotary connector permits the electrical connection between an electric device mounted on the steering wheel serving as a rotary member, and an electric device mounted on a vehicle body serving as a fixed member. In some rotary connectors, a flexible electric cable or optical fiber cable (hereinafter generically referred to as "flexible cable") is wound and held between a rotor section to be rotationally driven by the steering wheel and a casing for forming a stator section, the flexible cable being fixed to the rotor section at one end and to the stator section at the other end, and the electrical connection between the electric devices is permitted by winding and rewinding the flexible cable.

A conventional steering angle sensor unit will now be described.

FIG. 11 is a structural sectional view of a conventional steering angle sensor unit taken along line 11—11 in FIG. 12, FIG. 12 is a structural sectional view taken along line 12—12 in FIG. 11, and FIG. 13 is a structural sectional view taken along line 13—13 in FIG. 12.

As shown in FIGS. 11 to 13, a steering angle sensor unit 80 comprises a rotor member 52 that is fixed to a steering shaft (not shown) of a vehicle and that turns with the operation of a steering wheel (not shown), a first casing 53 spaced around the rotor member 52 at a predetermined interval and having a smooth inner peripheral surface to serve as a stator member, a flexible cable 54 for forming a rotary connector, a winding core 56 fitted in or integrally formed with a second casing 55 having a smooth inner peripheral surface to wind the flexible cable 54 thereon, and the like.

The first casing 53 and the second casing 55 are integrally formed, and the second casing 55 is spaced around the winding core 56 at a predetermined interval. A winding-assist member 57 that can turn coaxially with the winding core 56 is disposed between the second casing 55 and the winding core 56 at predetermined distances therefrom. A wall 58 is disposed between the first casing 53 and the second casing 55, and a cable path 59 is formed at the end of the wall 58.

In the steering angle sensor unit 80 having such a configuration, a steering angle sensor 70 contains a rotary connector 71.

A description will now be given of the structure and placement of the steering angle sensor 70 in the steering angle sensor unit 80.

Fixed to the rotor member 52 is a slit plate 60 having through holes 60a that are spaced at predetermined intervals in the circumferential direction. A photo-interrupter 61 is placed in the first casing 53 that does not move with the steering wheel being operated, and includes a photoreceptor 62 and a light emitting member 63 that sandwich the outer peripheral portion of the slit plate 60 and the through holes 60a. The photo-interrupter 61 also has a printed circuit board 64 for detecting signals that are output when the slit plate 60 blocks or passes the light travelling from the light emitting member 63 toward the photoreceptor 62.

The rotor member 52 having the slit plate 60 fixed thereto is loosely fitted with a clearance in holes 53c and 53d formed through an upper wall 53a and a lower wall 53b of the first casing 53. The printed circuit board 64 is connected to both the photoreceptor 62 and the light emitting member 63, and is provided with a power supply circuit (not shown) for supplying electric power to the photoreceptor 62 and the light emitting member 63, and the like.

The structure of the rotary connector 71 will be next described.

One end of the flexible cable 54 is fixed to the rotor member 52 serving as a rotor in the steering angle sensor 70.

The other end of the flexible cable 54 is wound on the winding core 56, fixed to the second casing 55, and electrically connected to an external output connector that is not shown.

Next, a description will be given of the operation of the steering angle sensor unit 80 having the configuration mentioned above.

First, when the steering wheel (not shown) is operated, the rotor member 52 in the steering angle sensor unit 80 turns. Thereby, the slit plate 60 also turns. With the turn of the slit plate 60, light emitted from the light emitting member 63 in the photo-interrupter 61 is blocked by or passed through the through holes 60a of the slit plate 60 that turns between the light emitting member 63 and the photoreceptor 62. A detection signal (photocurrent) output from the photoreceptor 62 based on the light thus passed or blocked is output via an electric circuit formed on the printed circuit board 64.

Based on this output signal, the turn angle of the steering shaft is calculated in a central processing unit (CPU), which is not shown, and the like. The turn angle of the steering shaft represents the steering amount or the steering angle of the steering wheel that is operated by a passenger in turning the vehicle. The turn state of the vehicle, the lateral acceleration of the vehicle body in the lateral direction, or the like is detected by using such calculated values, and this is used to control the vehicle in order to improve the stability of running of the vehicle or the riding comfort of the passenger, for example, to control the suspension.

When the rotor member 52 turns, the flexible cable 54 for constituting the rotary connector 71 is wound around the rotor member 52 or rewound. This flexible cable 54 electrically connects an electric device on the side of the steering wheel and an electric device on the side of the vehicle body.

The rotary connector generally comprises a pair of housings coupled so that they can relatively turn, and a flexible cable wound in an annular storage space defined between the housings. Both ends of the flexible cable are electrically led outside while they are fixed to the housings. One of the housings is used as a rotor member, and the other is used as a stator member. When the rotor member is turned in the forward or reverse direction, the flexible cable is wound up or rewound inside the storage space, depending on the turning direction.

The rotary connector having such a structure is incorporated in a steering device of a motor vehicle, and used as a connecting means for electrically connecting a steering wheel and a column. In this case, a known mounting structure is widely adopted, in which a rotor member in a rotary connector is connected to a steering wheel and a stator member in the rotary connector is attached to a combination switch on the side of a column. This combination switch contains various switch units, such as a head-lamp switch and a wiper switch. In general, the head-lamp switch is provided with an indicator cancel mechanism for causing a control lever at the right or left working position to automatically return to the center position.

In a well-known manner, a cancel cam is formed at a part of the rotor member that projects from the bottom face of the stator member in the rotary connector, and a cancel lever in the indicator cancel mechanism is put into the turn area of the cancel cam, whereby the indicator cancel mechanism is operated by using the turning force of the rotor member. In this case, when the steering wheel is turned to the neutral position, since the rotor member in the rotary connector turns along with the steering wheel, the cancel lever is driven by the cancel cam of the rotor member, and the control lever thereby automatically returns to the center position.

In the steering angle sensor unit having the configuration mentioned above, however, the rotor member 52, to which the slit plate 60 is fixed, functions as both a rotor member in the steering angle sensor 70 and a rotor member in the rotary connector 71, and is loosely fitted with a clearance in the holes 53c and 53d that are formed through the upper wall 53a and the lower wall 53b of the first casing 53. This is because the rotary connector 71 contains the flexible cable 54 and it does not stably turn when the flexible cable 54 is wound or rewound unless a predetermined clearance is ensured. Therefore, there is a need to provide some play between the rotor member and the stator member in the rotary connector 71. On the other hand, if there is a large clearance between the rotor member and the stator member in the steering angle sensor 70, the rotation axis of the rotor member substantially deviates (offsets in the axial and radial directions). Since the slit plate 60 is fixed to the rotor member, the position of the slit passing between the photoreceptor 62 and the light emitting member 63 substantially changes, whereby the detection signal, obtained by the passage and block of light between the light emitting member 63 and the photoreceptor 62 with the turn of the slit plate 60, fluctuates and is not stable. In recent years, the steering angle sensor 70 has been required to have higher precision and higher resolution, and the adverse effect of the play is not negligible.

Furthermore, the stator member and the rotor member that are constituents of the rotary connector are not closely coupled to each other, and, in general, the rotor member is turnably coupled with some clearance with respect to a guide hole of the stator member so that this clearance absorbs the measuring errors and the mounting errors of the components. Therefore, there is a fear that the rotor member will turn within the clearance at an inclined angle with respect to the center axis of the stator member mounted on a casing of the combination switch. If the cancel cam is formed at the projecting portion of the rotor member, as in the related art mentioned above, the cancel cam and the cancel lever are prone to relative offset, thereby disabling the cancel lever.

SUMMARY OF THE INVENTION

The present invention has been made to solve the problems of the related art, and has as an object the provision of a steering angle sensor unit formed by combining a rotary connector that needs a fixed play for smooth turn and a steering angle sensor that needs to limit the play for high precision and high resolution, without impairing the functions and performance thereof.

According to an aspect of the present invention, there is provided a steering angle sensor unit including a rotary connector for electrically connecting an electric device mounted on a steering wheel and an electric device mounted on a vehicle body, and a steering angle sensor for detecting information about the turn of the steering wheel, wherein a rotor member in the rotary connector and a rotor member in the steering angle sensor are formed of separate members, one of the rotor member in the rotary connector and the rotor member in the steering angle sensor has a slot extending in the radial direction, the other rotor member has a projection having almost the same diameter as the minor diameter of the slot, and the slot and the projection are engaged with each other.

According to another aspect of the present invention, there is provided a steering angle sensor unit including a rotary connector for electrically connecting an electric device mounted on a steering wheel and an electric device mounted on a vehicle body, and a steering angle sensor for detecting information about the turn of the steering wheel, wherein a rotor member in the rotary connector and a rotor member in the steering angle sensor are formed of separate members, the rotor member in the steering angle sensor has a slot extending in the radial direction, the rotor member in the rotary connector has a projection having almost the same diameter as the minor diameter of the slot, and the slot and the projection are engaged with each other.

Preferably, a coil spring is placed between the rotor member in the rotary connector and the rotor member in the steering angle sensor so that the resilient force of the coil spring resiliently urges both the rotor members in such a direction as to separate the rotor members.

Preferably, the rotor member in the rotary connector has a flexible engaging portion, the rotor member in the steering angle sensor has a projection to be engaged with the flexible engaging portion, and the flexible engaging portion is engaged with the projection.

Preferably, the flexible engaging portion and the slot extending in the radial direction that are formed in the rotor member of the rotary connector are located at positions spaced through an angle of 180° about the center axis of the rotor member.

The steering angle sensor unit may include a plurality of flexible engaging portions.

According to a further aspect of the present invention, there is provided a steering angle sensor unit including a rotary connector for electrically connecting an electric device mounted on a steering wheel and an electric device mounted on a vehicle body, and a steering angle sensor for detecting information about the turn of the steering wheel, wherein a rotor member in the rotary connector and a rotor member in the steering angle sensor are formed of separate members, the rotor member in the rotary connector and the rotor member in the steering angle sensor have rotary engaging sections at which the rotor members are engaged with each other, a coil spring is placed between the rotor member in the rotary connector and the rotor member in the steering angle sensor, and the rotor members are resiliently urged by the resilient force of the coil spring in such a direction as to separate the rotor members.

According to a still further aspect of the present invention, there is provided a steering angle sensor unit including a rotary connector for electrically connecting an electric device mounted on a steering wheel and an electric device mounted on a vehicle body, and a steering angle sensor for detecting information about the turn of the steering wheel, wherein stator members in the rotary connector and the steering angle sensor are combined with each other, rotor members in the rotary connector and the steering angle sensor are engaged via a play absorbing portion that permits the relative shift thereof in the radial direction, and the rotor member in the steering angle sensor has a cancel cam for operating an indicator cancel mechanism. In such a configuration, since the relative offset between the rotor members in the rotary connector and the steering angle sensor in the radial direction is absorbed, it is possible to set a sufficiently small clearance between the stator member and the rotor member in the steering angle sensor while a necessary clearance is ensured between the stator member and the rotor member in the rotary connector. Therefore, the indicator cancel mechanism can be reliably operated by the cancel cam formed in the rotor member of the steering angle sensor.

Further objects, features and advantages of the present invention will become apparent from the following description of the preferred embodiments with reference to the attached drawings.

DESCRIPTION OF THE PREFERRED EMBODIMENTS

The preferred embodiments of the present invention will now be described with reference to the attached drawings.

Figure 1:
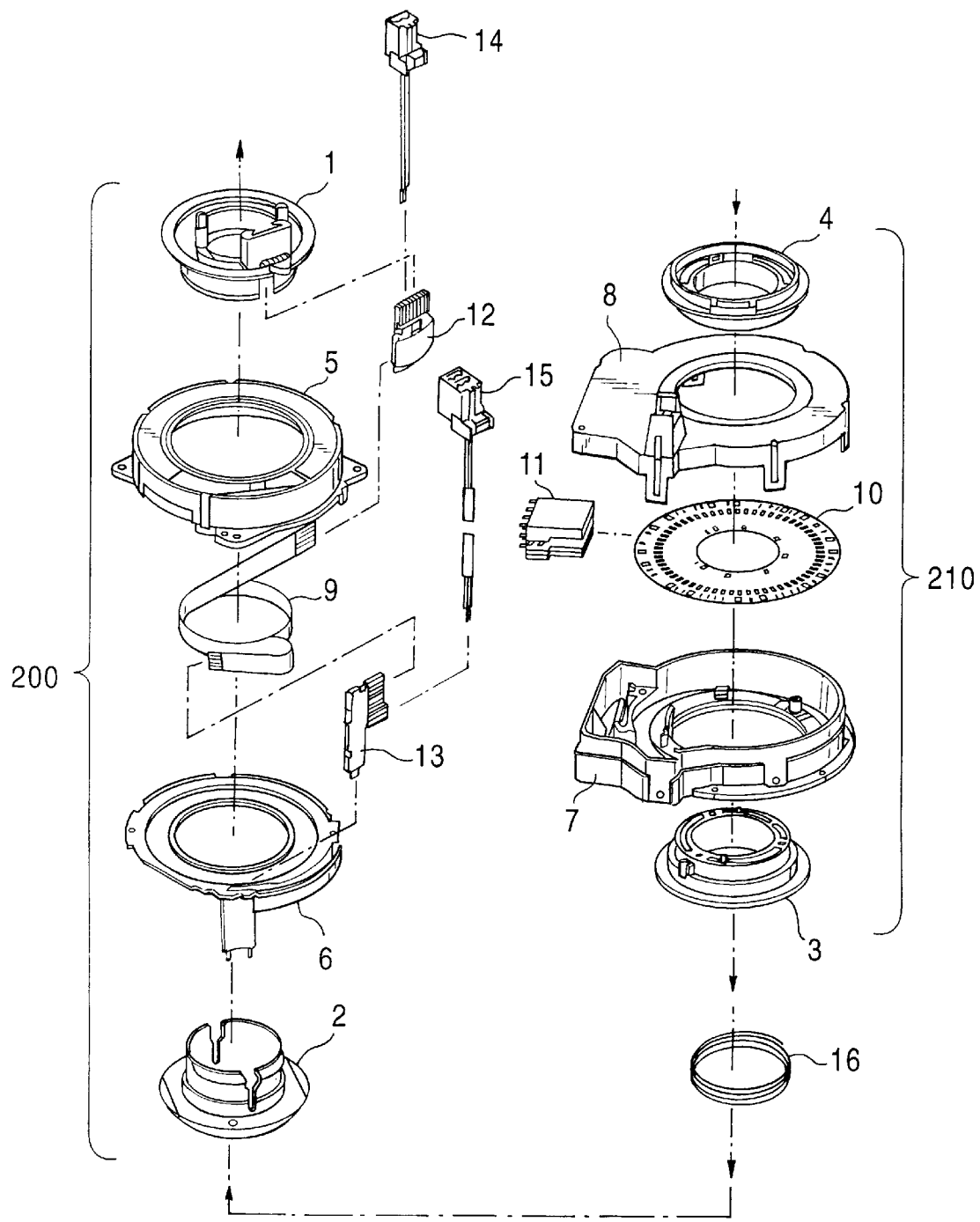
FIG. 1 is an exploded perspective view of a steering angle sensor unit according to a first embodiment of the present invention.

FIG. 1 is an exploded perspective view of a steering angle sensor unit according to a first embodiment of the present invention. As shown in FIG. 1, the steering angle sensor unit comprises a rotary connector 200 and a steering angle sensor 210 that are made in elastic contact with each other by a coil spring 16.

First, a description will be given of the rotary connector 200.

The rotary connector 200 generally comprises a pair of rotor members, an upper rotor member 1 and a lower rotor member 2, that are concentrically and turnably connected with respect to each other, a cable holder 5, a lower cover 6, and a flexible cable 9 that is held and wound in a space formed between the upper and lower rotor members 1 and 2, the cable holder 5, and the lower cover 6. Both ends of the flexible cable 9 are indirectly electrically led out of the cable holder 5 via an inner lead block 12 and an outer lead block 13. In this case, the inner lead block 12 is retained by the outer peripheral portion of the upper rotor member 1, and the outer lead block 13 is retained by the outer peripheral portion of the lower cover 6.

The upper rotor member 1 and the lower rotor member 2 are used as a movable housing, and the combination of the cable holder 5 and the lower cover 6 is used as a fixed housing. When the movable housing is turned clockwise or counterclockwise, the flexible cable 9 is wound or rewound inside the space.

In the rotary connector 200, the upper and lower rotor members 1 and 2 serving as the movable housing and the cable holder 5 and the lower cover 6 serving as the fixed housing are relatively loosely engaged with each other. In the engaged portion therebetween, a relatively large clearance is formed. The play between the movable housing and the fixed housing because of the clearance in the engaged portion keeps the turn of the rotary connector 200 stable.

In the rotary connector 200 having such a general structure, the fixed housing including the cable holder 5 and the lower cover 6 is fixed to a vehicle body, and the movable housing including the upper rotor member 1 and the lower rotor member 2 is fixed to a hub (not shown) of a steering shaft. Both ends of the flexible cable 9 are connected to electric devices in the vehicle body and a steering wheel via connectors 14 and 15, respectively.

Thereby, the rotary connector 200 is used as electrical connecting means for an automobile-installed air bag system, a horn circuit, and the like.

The steering angle sensor 210 will next be described. Incidentally, FIG. 1 shows the steering angle sensor 210 in an inverted position.

Referring to FIG. 1, the steering angle sensor 210 generally comprises a pair of covers, an upper cover 7 and a lower cover 8, that are concentrically connected to each other, a first rotor member 3 and a second rotor member 4 that are turnably connected to the upper cover 7 and the lower cover 8, and a code plate 10 and a photo-interrupter 11 that are held in the space formed between the upper and lower covers 7 and 8 and the first and second rotor members 3 and 4. The photo-interrupter 11 is disposed so that it crosses over a through hole on the code plate 10. The code plate 10 and the photo-interrupter 11 constitute, for example, an absolute encoder that precisely detects the turn angle and the like based on the turn of the code plate 10.

This code plate 10 is sandwiched and held between the first rotor member 3 and the second rotor member 4, and turns along therewith.

In the steering angle sensor 210 thus generally structured, a fixed housing including the upper cover 7 and the lower cover 8 is fixed to the fixed housing of the rotary connector 200, and a movable housing including the first rotor member 3 and the second rotor member 4 is engaged with the movable housing of the rotary connector 200. The photo-interrupter 11 outputs a detection signal.

The clearance between the first and second rotor members 3 and 4 serving as the movable housing and the upper cover 7 and the lower cover 8 serving as the fixed housing in the steering angle sensor 210 is kept smaller and more precise than that of the rotary connector 200. This stabilizes the position of the code plate 10 with respect to the photo-interrupter 11 that is located in a direction intersecting the center axis of the rotor member (radial direction).

As mentioned above, the upper cover 7 and the lower cover 8 serving as the fixed housing in the steering angle sensor 210 and the cable holder 5 and the lower cover 6 serving as the fixed housing in the rotary connector 200 are combined into one by screws or the like, and the fixed housing in the rotary connector 200 is fixed to the vehicle body. The first and second rotor members 3 and 4 serving as the movable housing in the steering angle sensor 210 and the upper and lower rotor members 1 and 2 serving as the movable housing in the rotary connector 200 are engaged with each other, and the upper rotor member 1 in the rotary connector 1 is fixed to the hub of the steering shaft.

Next, a description will be given of the lower rotor member 2 of the rotary connector 200 in the first embodiment of the present invention.

Figure 2:
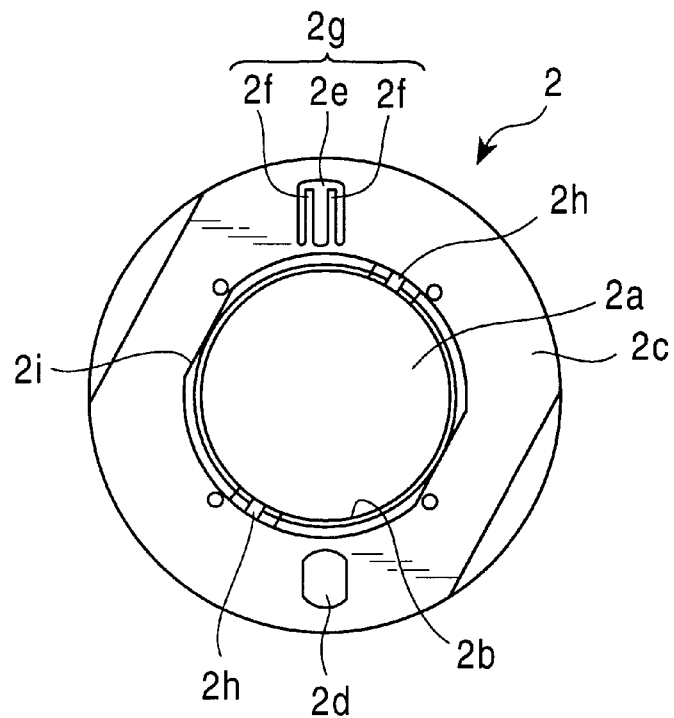
FIG. 2 is a plan view of a lower rotor member in a rotary connector of the steering angle sensor unit according to the first embodiment.
Figure 3:
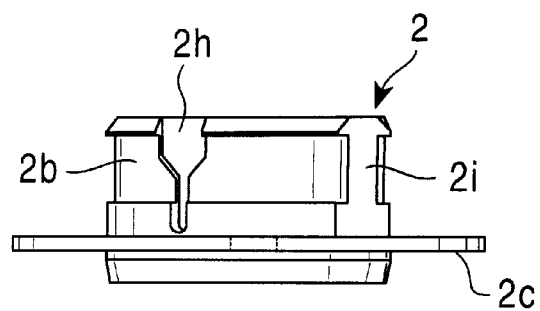
FIG. 3 is a side view of the lower rotor member shown in FIG. 2.
Figure 4:
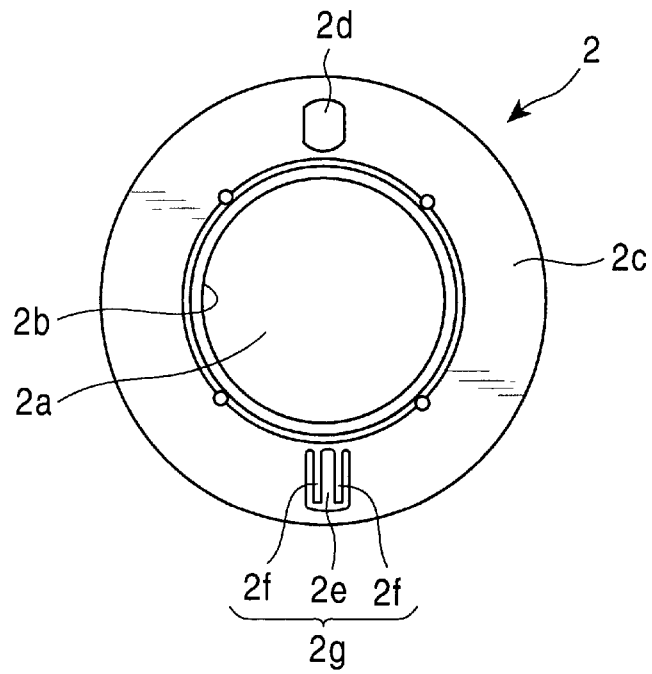
FIG. 4 is a bottom view of the lower rotor member shown in FIG. 2.

FIGS. 2, 3, and 4 are plan, side, and bottom views of the lower rotor member 2 in the rotary connector 200, respectively.

Referring to FIGS. 2 to 4, the lower rotor member 2 of the rotary connector 200 is made of a molding material, and almost shaped like a ring. The lower rotor member 2 includes a cylindrical portion 2b having a circular center hole 2a at the center thereof, and a circular flange portion 2c projecting out toward the periphery from the center of the cylindrical portion 2b.

The cylindrical portion 2b has at the upper end a pair of notches 2h that are almost shaped like a pen tip and opposed to each other across the center axis of the cylindrical portion 2b, and a pair of cutouts 2i that are shifted from the notches 2h through an angle of 90°. The flange portion 2c has at a predetermined position thereon a slot 2d for forming a rotary engaging section that is almost elliptically shaped, has parallel long sides, and extends in the radial direction. The flange portion 2c also has a rectangular hole 2e for forming a rotary engaging section that is formed at a position shifted from the slot 2d through an angle of 180° about the center axis of the center hole 2a. Moreover, a pair of retaining pieces 2f are formed in the shape of a fork projecting inwardly in parallel from one side of the hole 2e that is closer to the center hole 2a, and the retaining pieces 2f have elasticity in the circumferential direction of the flange portion 2c.

The hole 2e and the retaining pieces 2f and 2f constitute a flexible engaging portion 2g that forms the rotary engaging section. Through the center hole 2a, the steering shaft (not shown) penetrates.

Next, a description will be given of the first rotor member 3 in the steering angle sensor 210.

Figure 5:
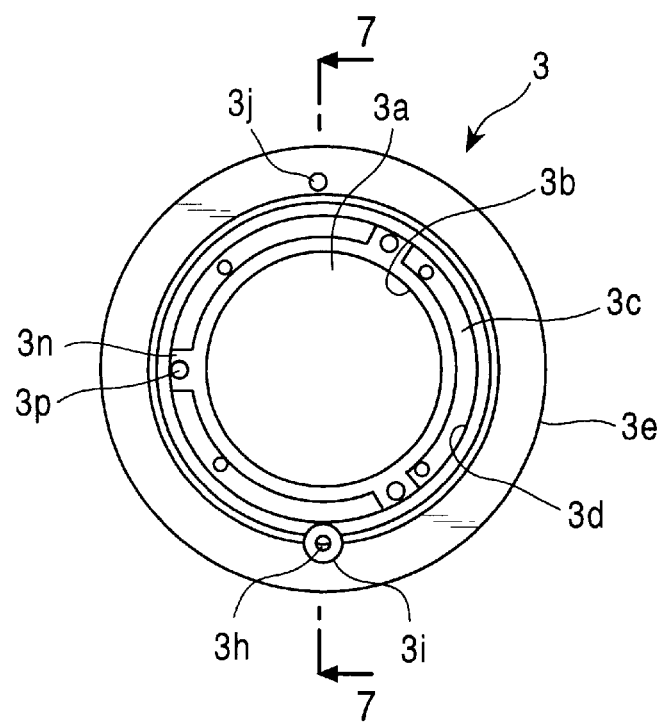
FIG. 5 is a plan view of a first rotor member in a steering angle sensor of the steering angle sensor unit according to the first embodiment.
Figure 6:
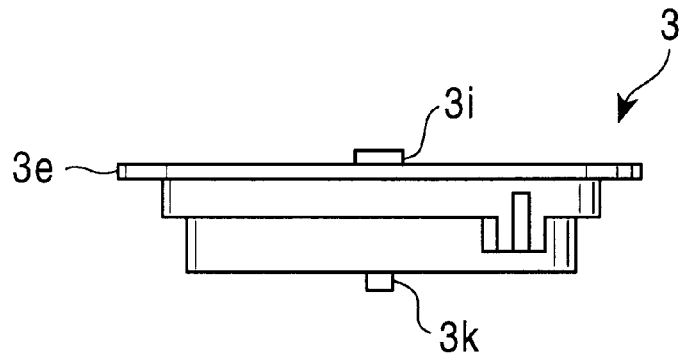
FIG. 6 is a side view of the first rotor member shown in FIG. 5.
Figure 7:
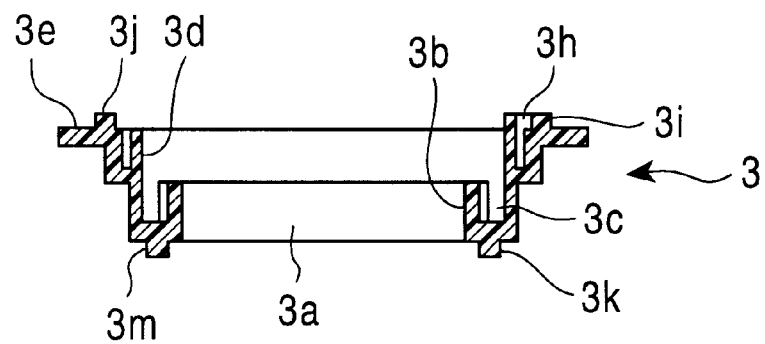
FIG. 7 is a cross-sectional view of the first rotor member taken along line 7—7 in FIG. 5.

FIGS. 5, 6, and 7 are plan, side, and cross-sectional views of the first rotor member 3 in the steering angle sensor 210, respectively.

Referring to FIGS. 5 to 7, the first rotor member 3 in the steering angle sensor 210 is formed by molding a molding material in about the shape of a ring, and comprises an inner cylindrical portion 3b having a circular center hole 3a at the center thereof, an outer cylindrical portion 3d, and a flange portion 3e formed around the upper end of the outer cylindrical portion 3d. The inner cylindrical portion 3b and the outer cylindrical portion 3d are connected at the lower ends, and thereby combined into one. Formed on the upper side of the flange portion 3e are a first cylindrical projection 3i that has a circular hole 3h at the center and projects upward to form the rotary engaging section, and a second cylindrical projection 3j that is located symmetrically about the center axis of the center hole 3a with respect to the first projection 3i to form the rotary engaging section. In the connected portion at the lower ends of the inner cylindrical portion 3b and the outer cylindrical portion 3d, third cylindrical projections 3k and 3m projecting outward are symmetrically positioned about the center axis of the center hole 3a.

Between the inner cylindrical portion 3b and the outer cylindrical portion 3d, arc-shaped recesses 3c are formed, and a plurality of (e.g., three) connecting portions 3n are also formed. The connecting portions 3n have threaded holes 3p. Through the center hole 3a, the steering shaft (not shown) penetrates.

Next, a description will be given of the engagement between the lower rotor member 2 in the rotary connector 200 and the first rotor member 3 in the steering angle sensor 210.

Figures 8, 9:
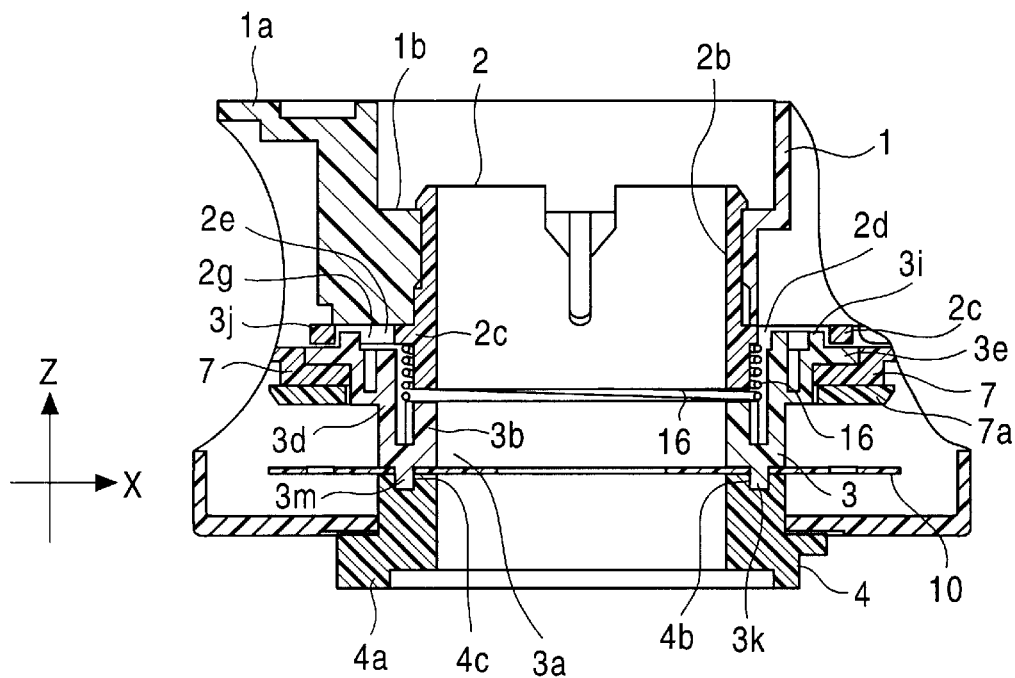
FIG. 8 is a cross-sectional view showing the principal part of the steering angle sensor unit according to the first embodiment.
FIG. 9 is an explanatory view of the steering angle sensor unit according to the first embodiment.

FIG. 8 is a cross-sectional view showing the principal part of an engaged state of the lower rotor member 2 in the rotary connector 200 and the first rotor member 3 in the steering angle sensor 210 in the embodiment of the present invention, and FIG. 9 is an explanatory view showing the engaged state shown in FIG. 8.

In assembling the rotary connector 200, the fixed housing is formed by retaining the lower cover 6 with the cable holder 5 containing the flexible cable 9, the cylindrical portion 2b of the lower rotor member 2 is inserted through the hole 1b of the upper rotor member 1 so that the flange portion 1a of the upper rotor member 1 faces up and the flange portion 2c of the lower rotor member 2 faces down, and the upper rotor member 1 and the lower rotor member 2 are combined with the fixed housing by snapping together.

As for the steering angle sensor 210, the fixed housing is assembled by retaining the upper cover 7 and the lower cover 8 having the photo-interrupter 11 and the code plate 10 therebetween, and then, the third projections 3k and 3m formed on the lower surface of the first rotor member 3 are engaged with recesses 4b and 4c formed on the upper surface of the second rotor member 4 while the code plate 10 is engaged with the third projections 3k and 3m so that the flange portion 3e of the first rotor member 3 faces up and the flange portion 4a of the second rotor member 4 faces down. Then, the first rotor member 3 and the second rotor member 4 are combined as the movable housing by screws (not shown) while holding the code plate 10 therebetween.

The coil spring 16 is placed between the outer wall of the cylindrical portion 2b of the lower rotor member 2 in the rotary connector 200 and the inner wall of the outer cylindrical portion 3d of the first rotor member 3 in the steering angle sensor 210, and the cable holder 5 in the rotary connector 200 and the upper cover 7 in the steering angle sensor 210 are combined by screws (not shown), whereby the steering angle sensor unit is assembled. In this state, the coil spring 16 is placed so as to lie on the upper faces of the connecting portions 3n in the first rotor member 3.

In this assembled state, the first rotor member 3 and the lower rotor member 2 are resiliently urged by the resilient force of the coil spring 16 in such a direction that they separate from each other. This resilient urging causes the lower side of the flange portion 3e of the first rotor member 3 in the steering angle sensor 210 to be always in contact with the upper side of an upper wall 7a of the upper cover 7.

When the lower rotor member 2 and the first rotor member 3 are engaged, the first projection 3i and the second projection 3j, which are formed on the flange portion 3e in the first rotor member 3 to constitute the rotary engaging sections, project toward the flange portion 2c of the lower rotor member 2. The first projection 3i is located inside the slot 2d that constitutes the rotary engaging section of the lower rotor member 2, and the second projection 3j is located between the pair of retaining pieces 2f and 2f that form the flexible engaging portion 2g serving as the rotary engaging section.

In this case, the minor diameter of the slot 2d is almost equal to the diameter of the first projection 3i, and the engagement therebetween forms a minute clearance (e.g., a clearance of about 50 μm). The major diameter of the slot 2d is larger than the diameter of the first projection 3i. Therefore, the first projection 3i is allowed to move in the direction of the major diameter of the slot 2d. The second projection 3j is in elastic contact with the retaining pieces 2f having elasticity inside the hole 2e, and is movable within the hole 2e in a similar manner to the first projection 3i.

As mentioned above, the lower rotor member 2 of the rotary connector 200 has such a structure as to allow offset (play) in the direction intersecting the center axis after being coupled with the high-precision steering angle sensor 210.

The play of the lower rotor member 2 in the X-Y direction (the direction orthogonal to the center axis) is allowed by the movement of the first projection 3i of the first rotor member 3 in the direction of the major diameter of the slot 2d, and the play in the Z direction (the direction of the center axis) is allowed by the resilient force of the coil spring 16 because the coil spring 16 is interposed between the lower rotor member 2 and the first rotor member 3.

While the coil spring 16 is freely held between the lower rotor member 2 and the first rotor member 3 in the above description, for example, both ends of the coil spring 16 may be fixedly caught by retaining portions (e.g., retaining holes) that are formed in the lower rotor member 2 and the first rotor member 3, respectively.

Next, a description will be given of the turn of the lower rotor member 2 and the first rotor member 3 in the engaged state mentioned above.

As shown in FIG. 9, when the steering shaft is turned, the turn is transmitted to the lower rotor member 2 via the upper rotor member 1 in the rotary connector 200 that is fixed to the hub of the steering shaft, so that the lower rotor member 2 also turns. The turn of the lower rotor member 2 is transmitted to the first rotor member 3 in the steering angle sensor 210.

The turn of the first rotor member 3 is precisely transmitted because the first projection 3i of the first rotor member 3 is engaged with the slot 2d of the lower rotor member 2 with little clearance therebetween.

The first rotor member 3 does not move in the direction of the center axis (the axial direction) because of the resilient force of the coil spring 16, and the lower surface of the flange portion 3e thereof is always in contact with the upper surface of the upper wall 7a of the upper cover 7. Since the length between the flange portion 3e and the code plate 10 is precisely defined, the length between the upper wall 7a and the code plate 10 is always kept constant. Therefore, the positions of the photo-interrupter 11 and the code plate 10 formed in the upper cover 7, namely, the position of the code plate 10 in the gap of the photo-interrupter 11 in the axial direction, is made fixed, and a stable encoder output signal can be obtained.

The lower rotor member 2 has the flexible engaging portion 2g besides the slot 2d. Since the outer peripheral surface of the second projection 3j of the first rotor member 3 that is engaged with the flexible engaging portion 2g is in contact with one of the retaining pieces 2f that form the flexible engaging portion 2g, the force of the contact also permits a constant turning force to be transmitted.

The reason will be described in connection with detection signals from the absolute encoder in the steering angle sensor 210.

Figure 10:
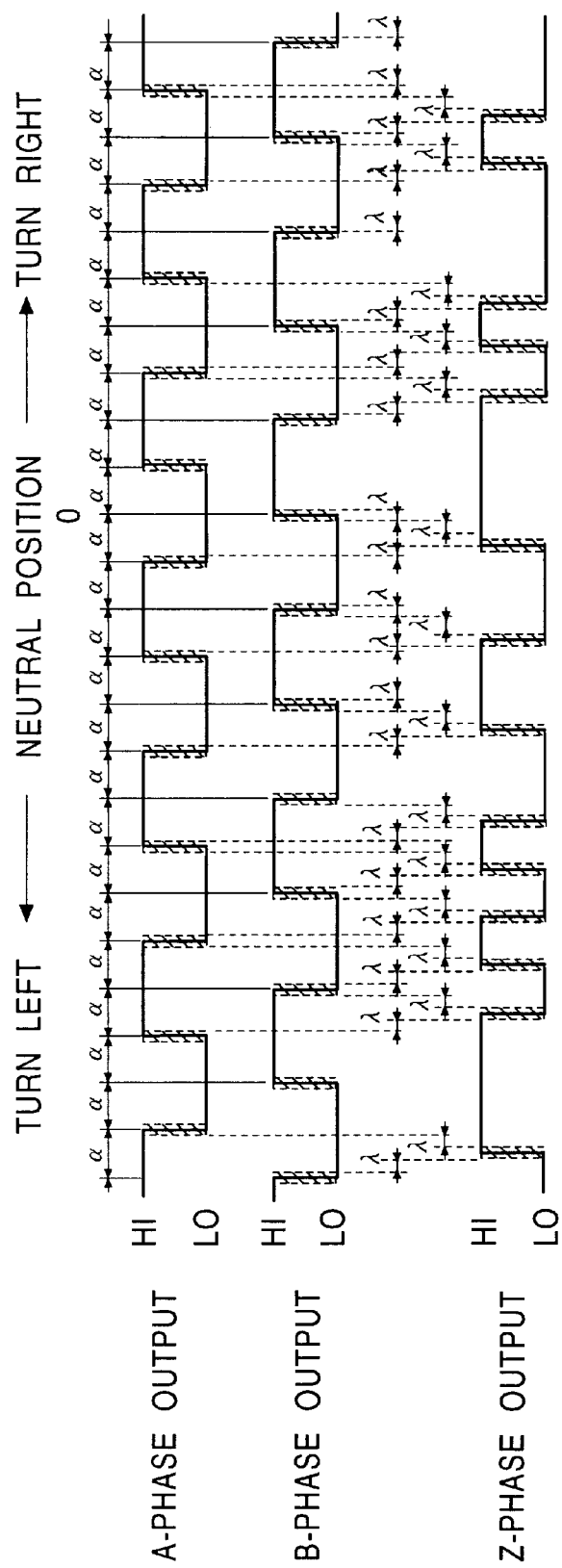
FIG. 10 is a waveform chart showing the waveform of signals output from an absolute encoder in the steering angle sensor unit according to the present invention.
Figure 11:
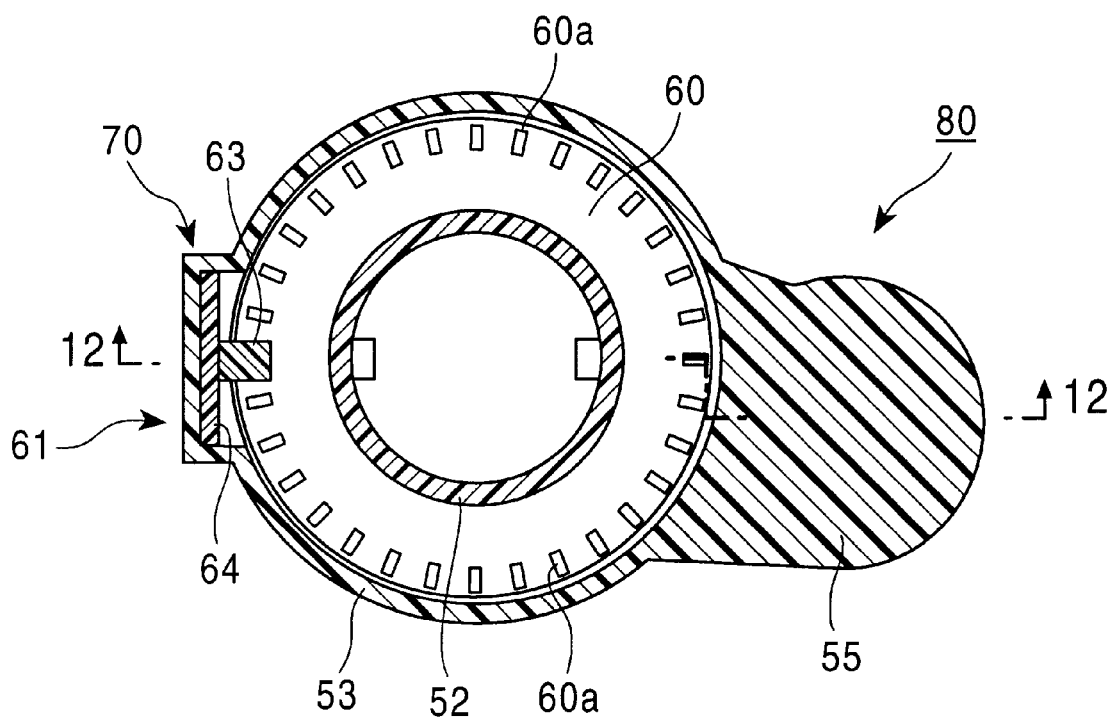
FIG. 11 is a structural sectional view of a conventional steering angle sensor unit taken along line 11—11 in FIG. 12.
Figure 12:
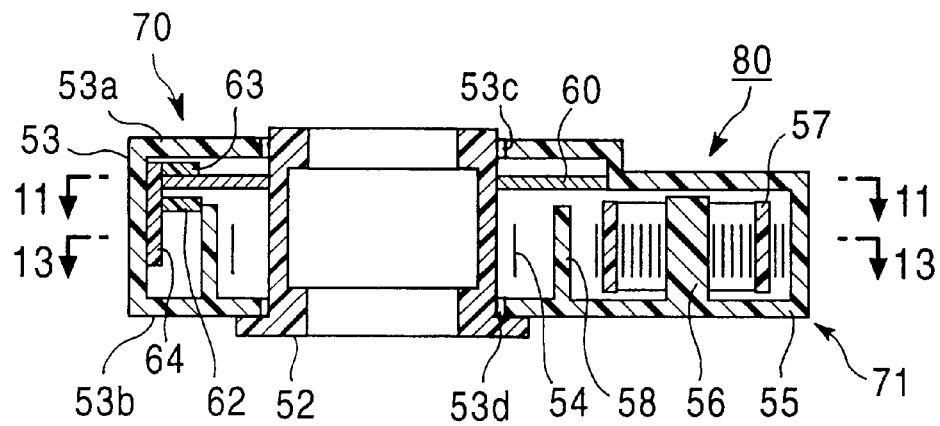
FIG. 12 is a structural sectional view taken along line 12—12 in FIG. 11.
Figure 13:
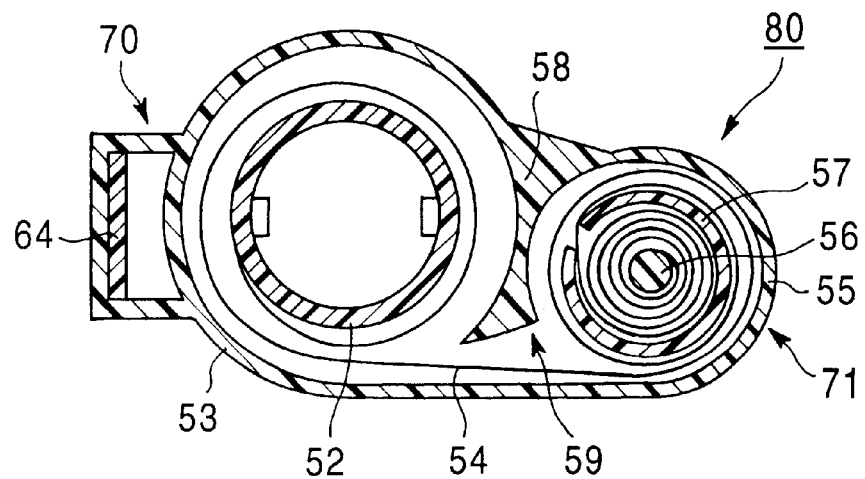
FIG. 13 is a structural sectional view taken along line 13—13 in FIG. 12.

FIG. 10 is a waveform chart showing detection signals output from the absolute encoder in the steering angle sensor 210.

The absolute encoder detects A-phase, B-phase, and Z-phase output signals, and calculates the turn angle and the like. The absolute encoder calculates the turn direction (clockwise or counterclockwise) and the turn angle of the steering shaft by detecting the rising waveform and the falling waveform of the A-phase signal and the rising waveform and the falling waveform of the B-phase signal.

Moreover, the absolute encoder reads the rising and falling positions of the Z-phase signal as codes based on the rise and fall of the A-phase and B-phase signals, or counts the width thereof, and calculates the turn angle from the reference position according to an arithmetic table stored in a central processing unit (CPU).

In actuality, however, the rising positions and the falling positions of the waves of the phases always vary due to optical, electrical and mechanical factors. For example, if it is assumed that the output phase difference between the rising or falling position of the Z-phase signal and the rising or falling position of the A-phase or B-phase signal is taken as a mechanical angle λ, when the value α, namely, the resolution, is 1.5° and there are no variations, all the mechanical angles λ are 0.75°. Actually, however, they vary as mentioned above. Measurements revealed that the minimum value of the mechanical angle λ is improved by about 5% to 10% (namely increased) when the lower rotor member 2 has the flexible engaging portion 2g besides the slot 2d and is engaged with the first rotor member 3 and turned at two points, compared with the case in which the lower rotor member 2 has only the slot 2d. This indicates that the flexible engaging portion 2g contributes to the turn of the rotor members.

As mentioned above, since the lower rotor member 2 in the rotary connector 200 has the slot 2c and the flexible engaging portion 2g, it is engaged with the first rotor member 3 in the steering angle sensor 210 at two points. This makes it possible to smoothly transmit the turn, to reduce the variations in the aforementioned angle λ, and to thereby obtain a more stable and more precise output signal.

While the lower rotor member 2 in the rotary connector 200 has one flexible engaging portion 2g in the first embodiment of the present invention, it may be possible to form a plurality of flexible engaging portions 2g in the lower rotor member 2 and to form a plurality of projections in the first rotor member 3 of the steering angle sensor 210 corresponding to this plurality of flexible engaging portions 2g.

While the configuration of the rotary engaging section, in which the lower rotor member 2 has the slot 2d and the flexible engaging portion 2g and the first rotor member 3 has two projections, has been described in the first embodiment of the present invention, it is not limited to the above-described structure. Conversely to the above, the lower rotor member 2 may have two projections and the first rotor member 3 may have the slot 2d and the flexible engaging portion 2g. Furthermore, two flexible engaging portions 2g may be formed without forming the slot 2d.

Next, a second embodiment of the present invention will be described.

A steering angle sensor unit according to the second embodiment of the present invention includes a rotary connector for electrically connecting an electrical component mounted on a steering wheel to a vehicle body, and a steering angle sensor for detecting information about the turn of the steering wheel, wherein stator members in the rotary connector and the steering angle sensor are fixed and combined with each other, rotor members in the rotary connector and the steering angle sensor are engaged via a play absorbing portion that permits the relative shift thereof in the radial direction, and the rotor member in the steering angle sensor has a cancel cam for operating an indicator cancel mechanism.

Preferably, as the play absorbing portion, one of the rotor members in the rotary connector and the steering angle sensor has a slot extending in the radial direction, and the other rotor member has a projection that is slidable inside the slot.

Figure 14:
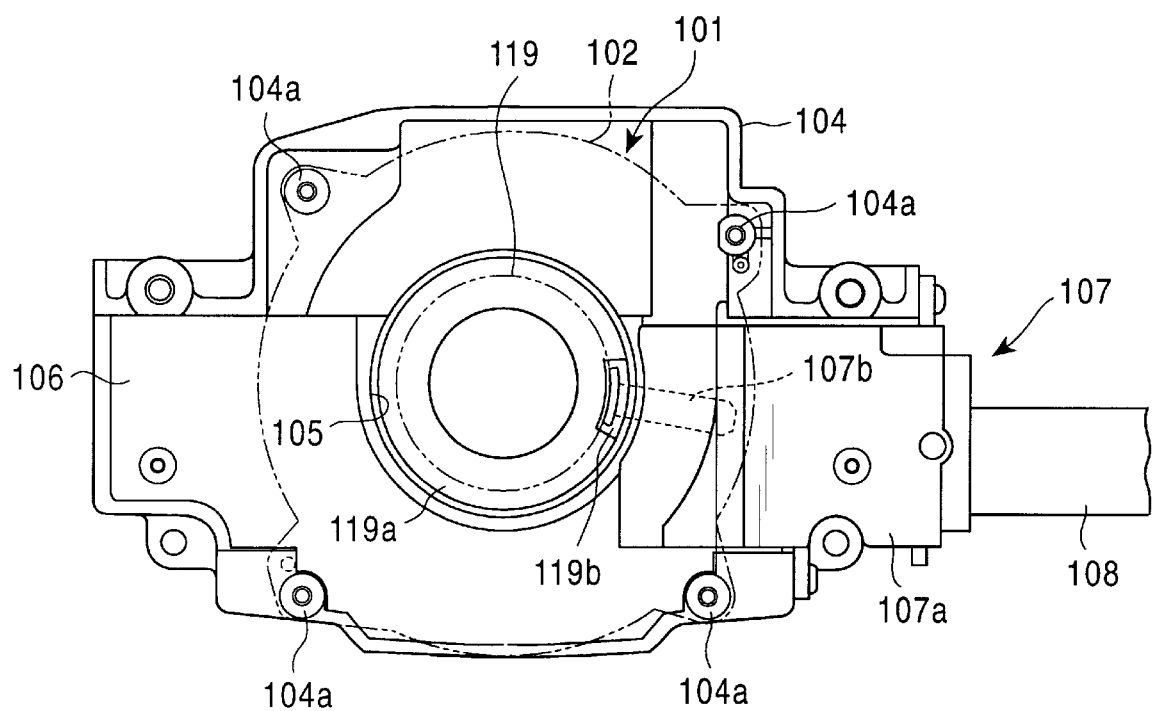
FIG. 14 is a plan view showing a state in which a steering angle sensor unit according to a second embodiment of the present invention is attached to a combination switch.
Figure 15:
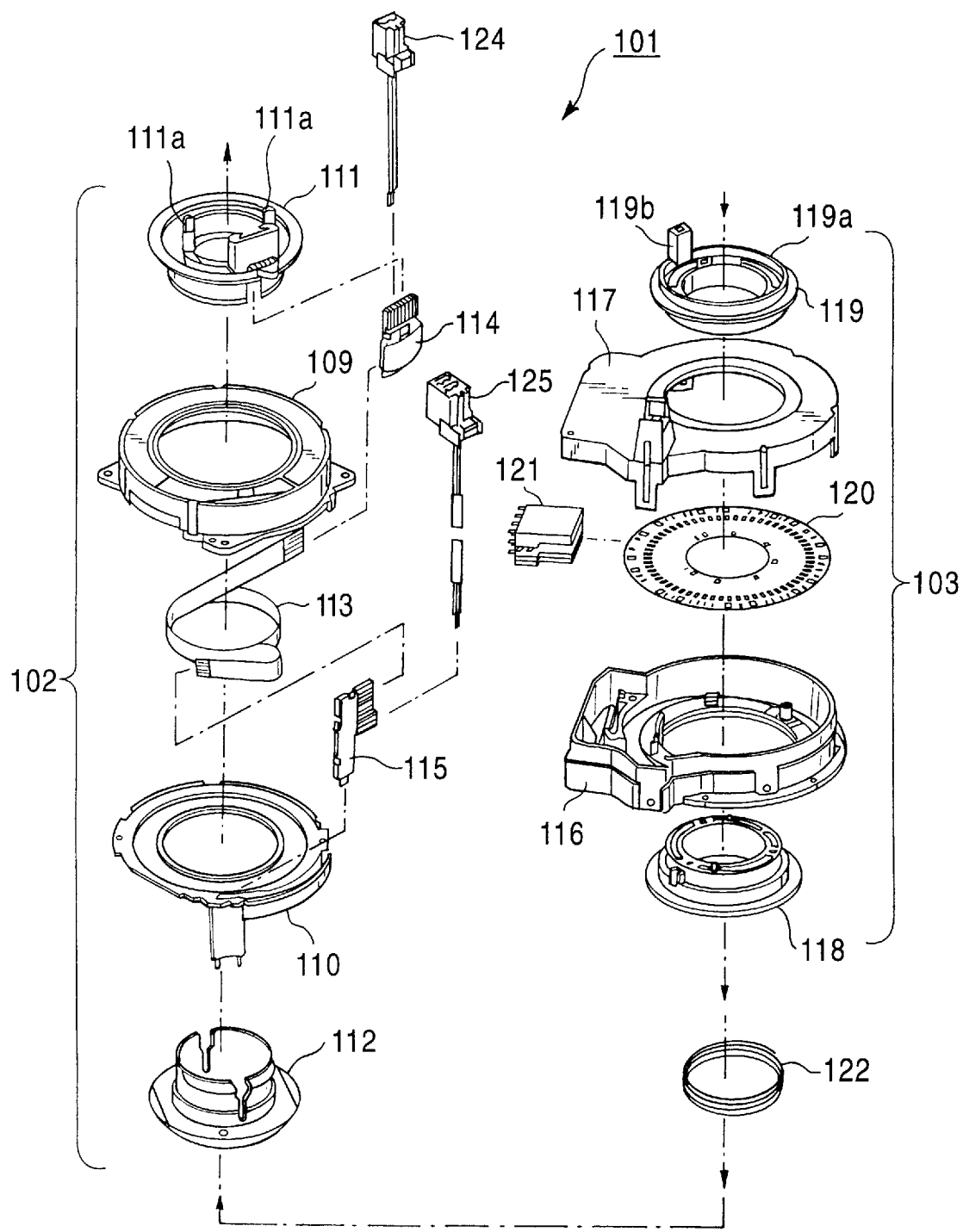
FIG. 15 is an exploded perspective view of the steering angle sensor unit according to the second embodiment.
Figure 16:
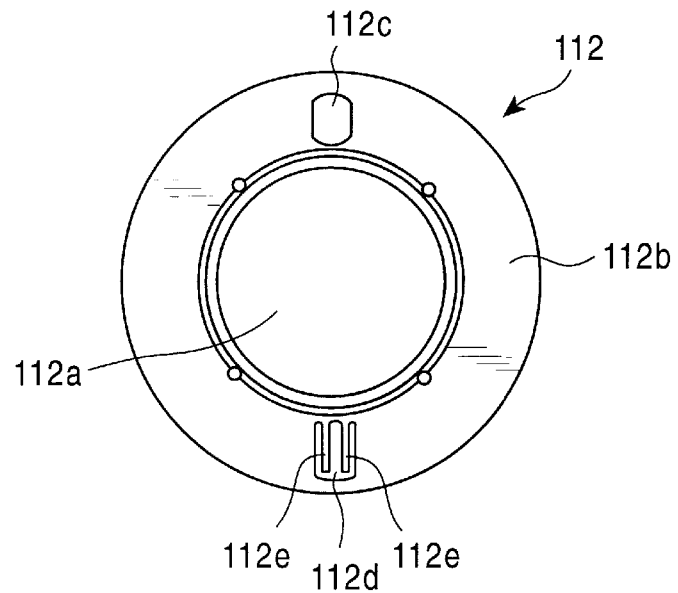
FIG. 16 is a bottom view of a lower rotor in a rotary connector of the steering angle sensor unit.
Figure 17:
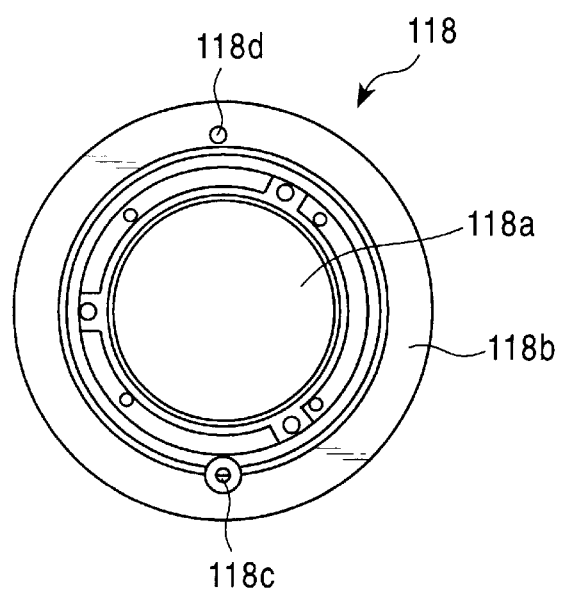
FIG. 17 is a plan view of an upper rotor in a steering angle sensor of the steering angle sensor unit.
Figure 18:
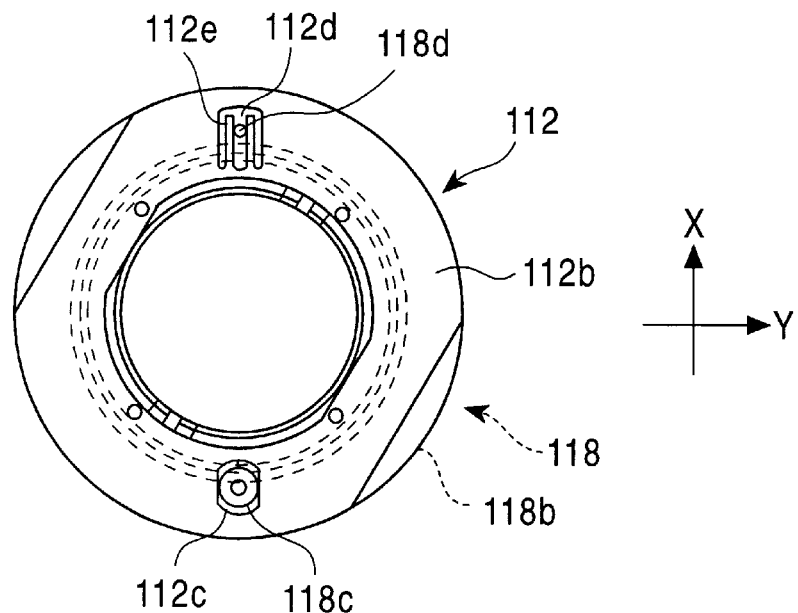
FIG. 18 is a plan view showing a state in which the lower rotor in the rotary connector and the upper rotor in the steering angle sensor are coupled to each other.
Figure 19:
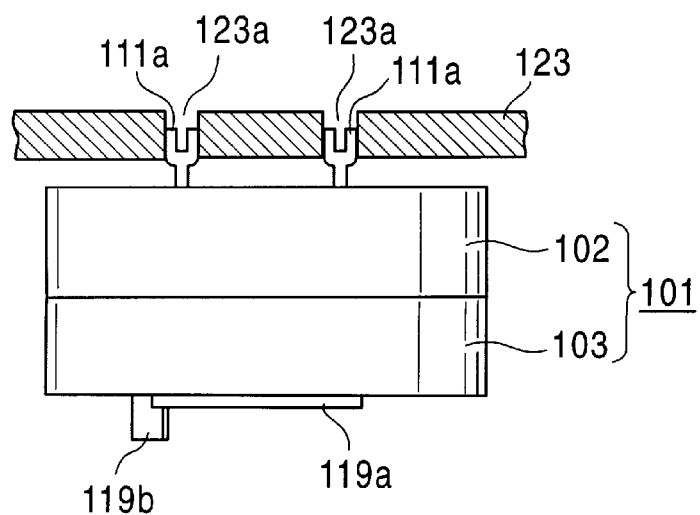
FIG. 19 is an explanatory view showing a state in which the steering angle sensor unit of the second embodiment and a steering wheel are connected to each other.

FIG. 14 is a plan view showing a state in which a steering angle sensor unit of the second embodiment is attached to a combination switch, FIG. 15 is an exploded perspective view of the steering angle sensor unit, FIG. 16 is a bottom view of a lower rotor in a rotary connector of the steering angle sensor unit, FIG. 17 is a plan view of an upper rotor in a steering angle sensor of the steering angle sensor, FIG. 18 is a plan view showing a state in which the lower rotor in the rotary connector and the upper rotor in the steering angle sensor are coupled to each other, and FIG. 19 is an explanatory view showing a state in which the steering angle sensor unit and a steering wheel are connected to each other.

A steering angle sensor unit 101 according to the second embodiment comprises a rotary connector 102 and a steering angle sensor 103 that are combined into one. This steering angle sensor unit 101 is to be incorporated as one unit component between a steering wheel and a combination switch on the side of a column.

As shown in FIG. 14, the combination switch has a casing 104 serving as an outer shell. The casing 104 has a plurality of supporting columns 104a, an insertion hole 105, and holder sections 106 opposing across the insertion hole 105 on the right and left sides thereof. A base 107a of a head-lamp switch 107 is fixed to one of the holder sections 106, and a control lever 108 for performing a right-and-left indication and an indication for passing is supported by the base 107a. The base 107a contains known mechanisms, such as a lock mechanism for locking the control lever 108 in the working position, an indicator cancel mechanism for causing the control lever 108 in the working position to automatically return to the center position. The leading end of a cancel lever 107b, which is a constituent of the indicator canceling mechanism, projects into the insertion hole 105. Although not shown, a wiper switch is mounted on the other holder section 106.

Referring to FIG. 15, the rotary connector 102 comprises a cable holder 109 and a lower cover 110 that combined into a first stator member, and an upper rotor 111 and a lower rotor 112 that are combined into a first rotor member. A flat cable 113 is wound, for example, in a spiral form in an annular space defined between the first stator member (the cable holder 109 and the lower cover 110) and the first rotor member (the upper rotor 111 and the lower rotor 112). Both ends of the flat cable 113 are electrically led out of the stator member including the cable holder 109 and the like via an inner lead block 114 and an outer lead block 115. In this case, the inner lead block 114 is retained by the outer peripheral portion of the upper rotor 111, and the outer lead block 115 is retained by the outer peripheral portion of the lower cover 110. The upper rotor 111 has a pair of finger portions 111a that project outside from the top face of the cable holder 109. When the upper rotor 111 and the lower rotor 112 serving as the first rotor member turn clockwise or counterclockwise with respect to the cable holder 109 and the lower cover 110 serving as the first stator member, the flat cable 113 is wound up or rewound inside the annular space. In this case, the upper rotor 111 and the lower rotor 112, and the cable holder 109 and the lower cover 110 are turnably coupled with a relatively large clearance. The play between the first rotor member and the first stator member because of the clearance keeps the turn of the rotary connector 102 stable.

The steering angle sensor 103, which is shown in an inverted position in FIG. 15, comprises an upper cover 116 and a lower cover 117 that are combined into a second stator member, and an upper rotor 118 and a lower rotor 119 that are combined into a second rotor member. A code plate 120 is fixedly held between the upper rotor 118 and the lower rotor 119. The lower rotor 119 has a cylindrical member 119a that projects outside from the bottom face of the lower cover 117. Formed in a part of the cylindrical member 119a is a cancel cam 119b for operating the cancel lever 107b in the aforementioned indicator cancel mechanism. A photo-interrupter 121 is disposed in an annular space defined between the second stator member (the upper cover 116 and the lower cover 117) and the second rotor member (the upper rotor 118 and the lower rotor 119) so that it crosses over through holes of the code plate 120. The code plate 120 and the photo-interrupter 121 constitute, for example, an absolute encoder. When the upper rotor 118 and the lower rotor 119 serving as the second rotor member turn clockwise or counterclockwise with respect to the upper rotor 118 and the lower rotor 119 serving as the second stator member, the code plate 120 turns along with the upper and lower rotors 118 and 119, and an output signal regarding information about the turn of the code plate 120 is detected from the photo-interrupter 121. In this case, the clearance between the upper rotor 118 and the lower rotor 119, and the upper cover 116 and the lower cover 117 is set smaller more precisely than in the rotary connector 102, which stabilizes the position of the code plate 120 with respect to the photo-interrupter 121 that lies in a direction intersecting the center axis of the second rotor member (radial direction).

As shown in FIG. 16, the lower rotor 112 in the rotary connector 102 has a center hole 112a at the center thereof, and a ring-shaped flange portion 112b formed around the center hole 112a. The flange portion 112b has a slot 112c and a rectangular hole 112d disposed at opposing positions that are spaced through an angle of 180° about the center of the center hole 112a. The slot 112c is almost elliptically shaped, and is provided with parallel long sides extending in the radial direction. The rectangular hole 112 also extends in the radial direction, and is provided with elastic pieces 112e on both sides thereof.

As shown in FIG. 17, the upper rotor 118 in the steering angle sensor 103 has a center hole 118a at the center thereof, and a ring-shaped flange portion 118b formed around the center hole 118a. The flange portion 118b has a first cylindrical projection 118c and a second cylindrical projection 118d placed at opposing positions that are spaced through an angle of 180° about the center of the center hole 118a.

The rotary connector 102 and the steering angle sensor 103 thus structured are combined and assembled as the steering angle sensor unit 101 as follows. That is, the cable holder 109 in the rotary connector 102 and the upper cover 116 in the steering angle sensor 103 are fixed by screws, which are not shown, in a state in which a coil spring 122 is interposed between the lower rotor 112 in the rotary connector 102 and the upper rotor 118 in the steering angle sensor 103, whereby the first stator member in the rotary connector 102 and the second stator member in the steering angle sensor 103 are fixed and combined with each other. In this case, since the lower rotor 112 in the rotary connector 102 and the upper rotor 118 in the steering angle sensor 103 are urged by the resilient force of the coil spring 122 in such a direction that they separate from each other, the resilient urging causes the lower surface of the flange portion 118b of the upper rotor 118 to be always in contact with the top face of the upper cover 116. Moreover, the first projection 118c and the second projection 118d of the upper rotor 118 are inserted in the slot 112c and the rectangular hole 112d of the lower rotor 112, respectively, as shown in FIG. 18, and the rotor member (the lower rotor 112) in the rotary connector 102 and the rotor member (the upper rotor 118) in the steering angle sensor 103 are coupled via two play absorbing portions that are formed of the engaged portion between the slot 112c and the first projection 118c and the engaged portion between the rectangular hole 112d and the second projection 118d.

The minor diameter of the slot 112c and the diameter of the first projection 118c are almost equally set so that the slot 112c and the first projection 118c are engaged with a minute clearance (e.g., 50 µm). Since the major diameter of the slot 112c is set adequately larger than the diameter of the first projection 118c, the first projection 118c is allowed to move in the direction of the major diameter of the slot 112c. Similarly, the rectangular hole 112d and the second projection 118d are engaged with little clearance, and the major diameter of the rectangular hole 112d is set adequately larger than the diameter of the second projection 118d. Therefore, the second projection 118d is also allowed to move in the direction of the major diameter of the rectangular hole 112d. Moreover, since the outer peripheral surface of the second projection 118d is sandwiched between the pair of elastic pieces 112e in contact therewith, the second projection 118d can move in the direction of the major diameter of the rectangular hole 112d without forming any play in the circumferential direction. Accordingly, the lower rotor 112 in the rotary connector 102 has such a structure as to allow the play in a direction intersecting the center axis (in the X-Y directions in FIG. 18) after being coupled to the high-precision steering angle sensor 103. The play in the direction of the center axis is allowed by the resilient force of the coil spring 122.

The steering angle sensor unit 101 thus assembled is incorporated for use between the steering wheel and the combination switch on the side of the column, as mentioned above. When being incorporated, first, the steering angle sensor unit 101 is laid on the casing 104 of the combination switch fixed to a column cover or the like, and the first and second stator members in the rotary connector 102 and the steering angle sensor 103, which has been combined into one, are screwed to the supporting columns 104b of the casing 104, as shown in FIG. 14. In this case, the cylindrical member 119a of the lower rotor 119 in the steering angle sensor 103 is inserted in the insertion hole 105 of the casing 104, and the cancel cam 119b formed on the cylindrical member 119a faces the leading end of the cancel lever 107b inside the insertion hole 105. Therefore, the relative position between the cancel cam 119b formed in the lower rotor 119 in the high-precision steering angle sensor 103, in which there is little clearance at the rotary engaging section, and the cancel lever 107b of the combination switch is precisely maintained.

After that, as shown in FIG. 19, a steering wheel 123 is fixed to a steering shaft that is not shown, and the finger portions 111a formed on the upper rotor 111 in the rotary connector 102 are inserted in and caught by retaining holes 123a that are formed at predetermined positions of the steering wheel 123. Moreover, both ends of the flat cable 113 are connected to the steering wheel 123 and the combination switch via connectors 124 and 125, respectively. Thereby, electrical components mounted on the steering wheel 123, such as an air bag inflator, are connected to the combination switch via the flat cable 113 in the rotary connector 102.

When the steering wheel 123 is turned clockwise or counterclockwise during operation, since the turning force is transmitted to the upper rotor 111 in the rotary connector 102 via the finger portions 111a, the flat cable 113 is wound up or rewound depending on the turning direction of the upper rotor 111 and the lower rotor 112 that constitute the first rotor member. The turning force of the first rotor member is transmitted to the second rotor member in the steering angle sensor 103, and the code plate 120 turns along with the upper and lower rotors 118 and 119 that constitute the second rotor member. Therefore, an output signal regarding information about the turn of the code plate 120 is detected from the photo-interrupter 121. In this case, as mentioned above, since the lower rotor 112 in the rotary connector 102 has such a structure as to allow the play in the direction intersecting the center axis, the turn of the lower rotor 112 can be transmitted to the upper rotor 118 in the steering angle sensor 103 in which there is little clearance at the rotary engaging section.

Furthermore, since the lower rotor 112 does not move in the direction of the center axis (the axial direction) because of the resilient force of the coil spring 122, the positions of the photo-interrupter 21 and the code plate 120 formed in the upper cover 116, namely, the operation gap, is fixed, which makes it possible to obtain a stable encoder output signal.

When the second rotor member in the steering angle sensor 103 thus turns, the cancel cam 119b formed on the lower rotor 119 in the second rotor member turns inside the insertion hole 105. Therefore, when the steering wheel 123 is turned to the neutral position, the cancel cam 119b drives the cancel lever 107b, and the control lever 108 at the working position thereby automatically returns to the center position. In this case, since the lower rotor 112 in the rotary connector 102 has such a structure as to allow the play in the direction intersecting the center axis thereof, the turn of the lower rotor 112 can be transmitted to the upper rotor 118 in the steering angle sensor 103 in which there is little clearance at the rotary engaging section, and the cancel lever 107b can be reliably operated by the cancel cam 119b of the lower rotor 119 that turns along with the upper rotor 118 in the steering angle sensor 103.

While the rotary connector is disposed on the side of the steering wheel and the steering angle sensor is disposed under the rotary connector in the above-mentioned embodiment, conversely, the steering angle sensor may be disposed on the side of the steering wheel, and the rotary connector may be disposed under the steering angle sensor. In this case, since the steering angle sensor is directly turned by the rotary connector, it can more precisely detect the steering angle of the steering wheel.

As mentioned above, in the steering angle sensor unit of the present invention, the rotor member in the rotary connector and the rotor member in the steering angle sensor are formed of separate members, one of the rotor members in the rotary connector and the steering angle sensor has a slot extending in the radial direction, the other rotor member has a projection having almost the same diameter as the minor diameter of the slot, and the slot and the projection are engaged with each other. Therefore, when the rotary connector, in which there is a large clearance between the fixed housing and the rotor member serving as the movable housing and which shifts in the direction orthogonal to the center axis by a relatively large amount, is engaged with the high-precision steering angle sensor, in which there is a small clearance between the fixed housing and the rotor member serving as the movable housing, the rotary connector and the steering angle sensor obtain a smooth turn.

Even if the center axes of the fixed housings of the rotary connector and the steering angle sensor, which are combined into one, offset from each other, this offset is absorbed by the engagement between the slot and the projection.

The coil spring is located between the rotor member in the rotary connector and the rotor member in the steering angle sensor, and both the rotor members are resiliently urged by the resilient force of the coil spring in such a direction as to separate the rotor members. Therefore, the flange portion of the rotor member in the steering angle sensor is always in contact with the upper wall of the upper cover, and the code plate fixed to the rotor member is always urged in the direction of the center axis. Thereby, the code plate and the photo-interrupter fixed to the fixed housing are located in a mutual stable relationship, which makes it possible to stabilize a detection signal from the photo-interrupter and to thereby provide a high-precision steering angle sensor unit.

Furthermore, the rotor member in the rotary connector has a flexible engaging portion, the rotor member in the steering angle sensor has a projection to be engaged with the flexible engaging portion, and the flexible engaging portion is engaged with the projection. Since the projections of the rotor member in the steering angle sensor are engaged at two points, with the flexible engaging portion and the slot, the turn of the rotor member in the rotary connector is more reliably transmitted to the rotor member in the steering angle sensor, which makes the turn more smooth.

When a plurality of flexible engaging portions are formed, the turn of the rotor member in the rotary connector can be even more reliably transmitted to the rotor member in the steering angle sensor.

In the steering angle sensor unit of the present invention, since the flexible engaging portion and the slot extending in the radial direction are formed on the flange portion of the rotor member in the rotary connector at positions spaced through an angle of 180° about the center axis of the rotor member, it is possible to provide a steering angle sensor unit that is able to most stably transmit the turn of the rotor member in the rotary connector to the rotor member in the steering angle sensor.

Furthermore, the steering angle sensor for detecting information about the turn of the steering wheel is combined with the rotary connector, the rotor members in the steering angle sensor and the rotary connector are engaged via the play absorbing portion that permits the relative shift therebetween in the radial direction, and the rotor member in the steering angle sensor has the cancel cam for operating the indicator cancel mechanism. Since the relative offset between the rotor members in the rotary connector and the steering angle sensor in the radial direction is absorbed, it is possible to set a sufficiently small clearance between the stator member and the rotor member in the steering angle sensor while a required clearance is ensured between the stator member and the rotor member in the rotary connector, and to cause the cancel cam formed on the rotor member in the steering angle sensor to reliably operate the indicator cancel mechanism.

While then present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structure and functions.

What is claimed is:

1. A steering angle sensor unit, comprising:
   a rotary connector for electrically connecting an electric device mounted on a steering wheel and an electric device mounted on a vehicle body; and
   a steering angle sensor for detecting information about the turn of said steering wheel,
   wherein a rotor member in said rotary connector and a rotor member in said steering angle sensor are formed of separate members, one of said rotor member in said rotary connector and said rotor member in said steering angle sensor has a slot extending in the radial direction, the other rotor member has a projection having almost the same diameter as the minor diameter of said slot, and said slot and said projection are engaged with each other.

2. A steering angle sensor unit according to claim 1, wherein a coil spring is placed between said rotor member in said rotary connector and said rotor member in said steering angle sensor, and both said rotor members are resiliently urged by the resilient force of said coil spring in such a direction as to separate said rotor members.

3. A steering angle sensor unit according to claim 1, wherein said rotor member in said rotary connector has a flexible engaging portion, said rotor member in said steering angle sensor has a projection to be engaged with said flexible engaging portion, and said flexible engaging portion is engaged with said projection.

4. A steering angle sensor unit according to claim 2, wherein said rotor member in said rotary connector has a flexible engaging portion, said rotor member in said steering angle sensor has a projection to be engaged with said flexible engaging portion, and said flexible engaging portion is engaged with said projection.

5. A steering angle sensor unit according to claim 3, wherein said flexible engaging portion of said rotor member in said rotary connector and said slot extending in the radial direction are located at positions spaced through an angle of 180° about the center axis of said rotor member.

6. A steering angle sensor unit according to claim 3, wherein a plurality of said flexible engaging portions are formed.

7. A steering angle sensor unit, comprising:

a rotary connector for electrically connecting an electric device mounted on a steering wheel and an electric device mounted on a vehicle body; and a steering angle sensor for detecting information about the turn of said steering wheel, wherein a rotor member in said rotary connector and a rotor member in said steering angle sensor are formed of separate members, said rotor member in said rotary connector and said rotor member in said steering angle sensor each have a rotary engaging section at which said rotor members are engaged with each other, a coil spring is placed between said rotor member in said rotary connector and said rotor member in said steering angle sensor, and said rotor members are resiliently urged by the resilient force of said coil spring in such a direction as to separate said rotor members.

8. A steering angle sensor unit, comprising:

a rotary connector for electrically connecting an electrical component mounted on a steering wheel to a vehicle body; and a steering angle sensor for detecting information about the turn of said steering wheel, wherein stator members in said rotary connector and said steering angle sensor are fixed and combined with each other, rotor members in said rotary connector and said steering angle sensor are engaged via a play absorbing portion that permits the relative shift thereof in the radial direction, and said rotor member in said steering angle sensor has a cancel cam for operating an indicator cancel mechanism.

9. A steering angle sensor unit according to claim 8, wherein one of said rotor members in said rotary connector and said steering angle sensor has a slot extending in the radial direction, the other rotor member has a projection that is slidable inside said slot, and said slot and said projection constitute said play absorbing portion.

* * * * *